June 19, 1956 W. S. DORSEY 2,751,282
APPARATUS FOR THE PRODUCTION OF ACETYLENE
Original Filed March 26, 1951

INVENTOR.
WILLIAM SMITH DORSEY,
BY Richard C. Hartman
ATTORNEY.

United States Patent Office 2,751,282
Patented June 19, 1956

2,751,282

APPARATUS FOR THE PRODUCTION OF ACETYLENE

William Smith Dorsey, Fullerton, Calif., assignor to Union Oil Company of California, Los Angeles, Calif., a corporation of California Original application March 26, 1951, Serial No. 217,633. Divided and this application January 29, 1953, Serial No. 334,015

6 Claims. (Cl. 23—284)

This invention relates to the production of acetylene by the partial oxidation of hydrocarbon vapors, and in particular concerns an apparatus for the production of acetylene in a highly efficient and economic manner.

In the co-pending application of John L. Bills, Serial No. 240,728, filed August 7, 1951, now U. S. Patent No. 2,679,544, there is described a process whereby acetylene is produced by preheating a gas mixture comprising a hydrocarbon and oxygen, admixing hydrogen with the preheated gas mixture whereby an exothermic reaction occurs with a consequent increase in temperature to about 1100°–1500° C., and thereafter quench cooling the resulting product gas to a relatively low temperature within a very short period of time. The preheat temperature is so controlled that the requisite high reaction temperature derives from the exothermic heat of the reaction itself and without the addition of any further substantial quantity of heat. This process is highly effective in securing relatively high yields of acetylene based on the quantity of hydrocarbon consumed, and is particularly attractive from the standpoint of chemical cost since air may be employed as the source of oxygen and the hydrocarbon may be low-cost natural gas. Heating costs, however, are considerable, particularly when air is employed as a source of oxygen, since a large volume of gas must be preheated to moderately high temperatures, e. g. about 600° C. or higher, and despite the fact that the reaction itself is highly exothermic and evolves large quantities of heat, substantially all of such heat is lost in the cooling step to the quenching medium. Previous attempts to combine the preheating step with the quenching step so that the hot product gas is used to preheat the feed gas and is itself thereby quenched have not proved successful, primarily by reason of the limitations of conventional heat transfer equipment, and also by reason of the fact that the hot product gas must be quenched within a very short period of time after its formation. Potentially, however, the process is capable of being operated autothermically since the exothermic heat of reaction is sufficient to heat the reactant gas to the requisite preheat temperature.

It is accordingly an object of the present invention to provide a means for improving the thermal efficiency of the aforesaid process for the production of acetylene.

Another object is to provide a unitary apparatus for the production of acetylene, which apparatus comprises a plurality of reactant gas preheating zones, reaction zones, and product gas quenching zones so juxtaposed that a highly efficient transfer of heat from the hot product gas to the reactant gas is attained within the necessary short period of time as hereinafter more fully described.

Other objects will be apparent from the following detailed description of the invention, and various advantages not specifically referred to herein will occur to those skilled in the art upon employment of the invention in practice.

I have now found that the above and related objects may be realized in a reactor wherein each of two streams of reactant gas is passed successively through a preheating zone, a reaction zone and a quenching zone, said reactor being so constructed that the preheating zone for one stream of gas lies immediately adjacent the quenching zone for the other stream, and the two reaction zones lie substantially side-by-side, each set of preheating, reaction and quenching zones being separated from the other by heat-conducting walls. Hydrogen, or a hydrogen-containing gas, is admixed with each stream of preheated reactant gas as it enters its respective reaction zone, whereby the exothermic acetylene-producing reaction is initiated and the high reaction temperature thereby attained.

In effecting the production of acetylene employing the apparatus of the invention, two streams of reactant gas are introduced into the reactor and two corresponding streams of cooled product gas are removed. Within the reactor the separate streams move countercurrent and in indirect heat exchange relationship with one another so that one stream of hot product gas is quenched by giving up its sensible heat to the other stream of reactant gas, thereby heating the latter to the required preheat temperature. Thermal energy is thus recirculated within the reactor itself and results in such a high degree of heat efficiency that the process may be carried out substantially autothermically, i. e., without the substantial addition of heat, once steady-state condition has been established. By suitably controlling the gas velocity with respect to the volume of the respective preheating, reaction and quenching zones, the optimum preheat temperature and short reaction time may be maintained and a maximum yield of acetylene realized without substantial consumption of heat supplied from exterior sources.

The reactor in which this process is carried out may take a variety of forms as will be apparent from the description of the accompanying drawings. In general, however, the reactor will comprise an elongated reaction vessel which is divided longitudinally into a plurality of parallel chambers extending the length of the vessel. The dividing walls are constructed of a heat conducting material so as to allow the transfer of heat between adjacent chambers. At one end of the vessel there are provided means for introducing reactant gas into alternate chambers, and means for withdrawing product gas from the remaining alternate chambers. At the opposite end of the vessel there are provided means for withdrawing product gas from those chambers which at their opposite ends are fitted with reactant gas introducing means, and means for introducing reactant gas into those chambers which at their opposite ends are fitted with product gas withdrawal means. Each of the chambers comprises a preheating zone, a reaction zone and a quenching zone so located that the gas introduced into each chamber passes through these zones in the order named, and is withdrawn from the quenching zone through the product gas withdrawal means associated with that particular chamber. By reason of the alternate disposition of the chambers, the preheating zone associated with each chamber lies immediately adjacent to the quenching zone of the adjacent chamber, whereas the reaction zone of each chamber lies immediately adjacent to the reaction zone of the adjacent chamber. Also associated with each chamber are means for introducing a hydrogen-containing gas into each of the reaction zones. Such means may comprise tubular inlets disposed coaxially with the reactant gas preheating zone so that the hydrogen-containing gas is likewise preheated prior to its admixture with the preheated reactant gas in the reaction zone, and enters the reaction zone concurrently with the preheated reactant gas. They should be so constructed, however, that admixing of the hydrogen-containing gas with the reactant gas does not occur until the latter has become heated to the requisite preheat temperature. Alternatively, the hydrogen-containing gas inlet means may be disposed parallel to the preheating zone, or they may be so disposed that the hydrogen-containing gas enters the reaction zone from a direction other than parallel to that of the preheated reactant gas.

The process and apparatus of the invention will be more clearly understood by reference to the accompanying drawing which forms a part of this specification. In said drawing.

Figure 1:
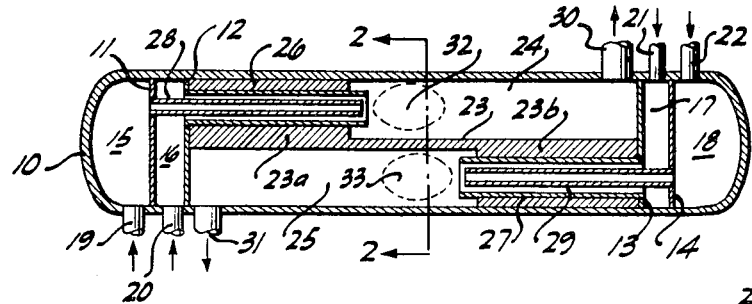
Figure 1 represents a longitudinal cross-sectional view of a simple apparatus embodying the principle of the invention.
Figure 2:
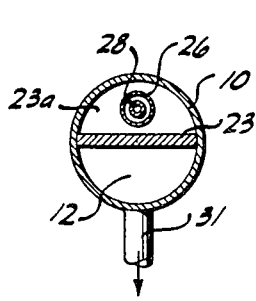
Figure 2 is a transverse cross-sectional view of the same apparatus taken along line 2—2 of Figure 1.

Referring now to Figures 1 and 2, in which like numerals designate like parts, the illustrated apparatus comprises a closed cylindrical vessel 10 provided with internal transverse walls 11, 12, 13 and 14 which define within vessel 10 a first reactant gas header 15, a first hydrogen-containing gas header 16, a second hydrogen-containing gas header 17, and a second reactant gas header 18. Header 15 is provided with a first reactant gas inlet 19, header 16 is provided with a first hydrogen-containing gas inlet 20, header 17 is provided with a second hydrogen-containing gas inlet 21, and header 18 is provided with a second reactant gas inlet 22. Each of said inlets communicates through suitable flow control devices to an exterior source of the appropriate gas, not shown. Within vessel 10, a heat-conducting longitudinal wall 23 divides the space between transverse walls 12 and 13 into hemi-cylindrical chambers 24 and 25 of equal volume. Each of said chambers constitutes a reaction and quenching zone for the gases introduced into headers 15 and 16, and headers 17 and 18, respectively. The dividing wall 23 is provided with hemi-cylindrical end portions 23a and 23b disposed on opposite sides of its major axis, which end portions limit the length of chambers 24 and 25 to somewhat less than distance between transverse walls 12 and 13 but not to such an extent that they fail to overlap. End portions 23a and 23b are bored to receive first and second hydrogen-containing gas preheating tubes 26 and 27 which communicate between chamber 24 and header 16, and between chamber 25 and header 17, respectively. Positioned coaxially within first and second hydrogen-containing gas preheating tubes 26 and 27, are first and second reactant gas preheating tubes 28 and 29, respectively, which communicate between chamber 24 and header 15, and between chamber 25 and header 18, respectively. First and second product gas outlet conduits 30 and 31 communicate between chambers 24 and 25 and product gas storage means, not shown, and are positioned adjacent to the end of each chamber opposite that defined by end-portions 23a and 23b.

Operation of the reactor shown in Figures 1 and 2 is as follows: A first stream of reactant gas comprising a hydrocarbon and oxygen, e. g. a suitable proportioned mixture of methane or natural gas and air, is introduced into header 15 through inlet 19, and passes through reactant gas preheating tube 28 into chamber 24. Simultaneously, a hydrogen-containing gas, e. g. hydrogen itself or a mixture of hydrogen and nitrogen or other inert gas, is introduced into header 16 through inlet 20, and passes into chamber 24 through the annular space between tubes 26 and 28. During the passage of these gases through their respective preheating tubes they are preheated to a moderately high temperature, e. g. 600° C. or above, by the transfer of heat through the end-portion 23a of wall 23 from hot product gases which occupy adjacent chamber 25. At the termination of tubes 26 and 28, the reactant gas and hydrogen-containing gas become admixed, whereby the acetylene-producing reaction is initiated. Such reaction takes place within reaction zone 32, which may take the form of a free flame, within chamber 24, and occurs with the evolution of sufficient heat to raise the temperature of the reacting gases to 1100°–1500° C. The hot product gas passes from reaction zone 32 through the remainder of the length of chamber 24 which constitutes a quenching zone. Within this zone the hot product gas loses a large proportion of its sensible heat by heat transfer through end-portion 23b of dividing wall 23 to cold hydrogen-containing and reactant gases passing through preheating tubes 27 and 29, respectively. The rate of flow of the hot product gas through the quenching zone is so controlled as to become cooled to a temperature at which substantially no further reaction occurs within from about 0.001 to about 0.05 second after admixing of the preheated hydrogen-containing and reactant gases at the termination of preheating tubes 26 and 28. The cooled product gas is withdrawn from the quenching zone and is passed to product gas storage and recovery system through outlet conduit 30. Concurrently in time with these operations, second reactant gas and hydrogen-containing gas streams are introduced into their respective headers through inlets 22 and 21, respectively, and pass through their respective preheating tubes 29 and 27 wherein they are preheated by the transfer of heat from the first hot product gas stream in chamber 24 through end-portion 23b of dividing wall 23. The preheated gases become admixed at the termini of tubes 27 and 29, and react with the evolution of heat to form acetylene in reaction zone 33 within chamber 25. The hot product gas then passes through the remaining length of chamber 25 which constitutes a quenching zone, and is cooled to a temperature at which substantially no further reaction occurs by loss of heat through end-portion 23a of dividing wall 23 to the first streams of reactant and hydrogen-containing gases passing through their respective preheating tubes 28 and 26. As in the case of the first product gas stream, the second product gas should be cooled to such temperature within 0.001–0.05 second after admixing of the reactant and hydrogen-containing gas at the termini of tubes 27 and 29. The cooled product gas is withdrawn from chamber 25 and passed to product gas storage and recovery means through outlet conduit 31.

It will be seen that this process and apparatus permits a most efficient utilization of the exothermic heat of reaction. Such heat is sufficient to preheat the reactant gas to the necessary temperature and, in a well-insulated reactor, to make up for incidental heat losses to the atmosphere. It is a feature of the invention that the reaction zones of the respective gas streams lie substantially side-by-side and are separated only by a relatively thin heat-conducting wall. The two reactions are thus effected in indirect heat exchange relationship with one another although under normal conditions there is substantially no transfer of heat from one reaction zone to the other. By operating in this manner, heat losses from the reaction zone are reduced and the requisite high reaction temperature can be maintained autothermically. Loss of heat through the exterior walls of the reactor may be avoided through the use of suitable insulation. As will be apparent to those skilled in the art, maximum thermal efficiency will be attained by suitably sub-dividing each of the reactant gas streams into a number of smaller streams and conducting the operation so that each of said smaller streams is in heat exchange relationship with an adjacent stream. The apparatus and process described in connection with Figures 1 and 2 have been limited to two streams merely to simplify illustration of the principle of the invention.

Figure 4:
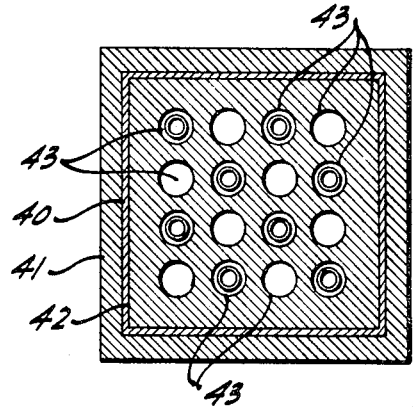
Figure 4 is a transverse cross-sectional view of the same reactor taken along line 4—4 or Figure 3.
Figure 3:
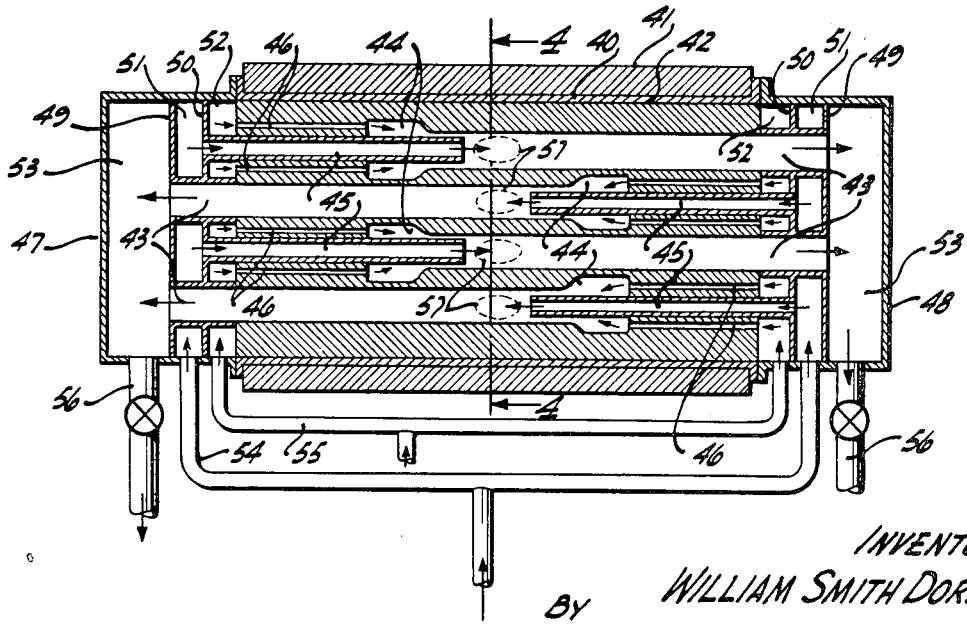
Figure 3 is a longitudinal cross-sectional view of a multi-chambered autothermic reactor suitable for carrying out the process of the invention on a commercial scale.

Referring now to Figures 3 and 4, in which like numerals designate like parts, there is shown a large-scale reactor which comprises a metal shell 40 of substantially square cross-section and provided with an outside layer of thermal insulation 41. Shell 40 surrounds core 42 which is composed of a refractory mass such as sillimanite, mullite, or other known type of dehydrated aluminum silicate ceramic material. Core 42 is provided with a plurality of uniformly arranged substantially parallel longitudinal holes bored alternately from opposite ends of the core, each of said holes forming an elongated chamber 43. There is thus provided two sets of chambers extending from opposite ends of core 42 having axes which are substantially parallel but spaced apart so that each member of the first set of chambers lies adjacent to a member of the second set of chambers and is separated therefrom by a relatively thin internal wall of the core. Each of said chambers terminates within core 42 in an enlarged chamber 44 at a point somewhat beyond the transverse central plane (4—4) of the core, and each of said enlarged chambers communicates with the near end of the core by means of a longitudinal bore adapted to receive reactant gas preheating tube 45. Each of the latter tubes extends through enlarged chamber 44 and into chamber 43, terminating at a point short of the transverse central plane (4—4) of core 42. Each of enlarged chambers 44 also communicates with the near end of the core by means of two or more longitudinal bores 46 which serve as hydrogen-containing gas preheating zones. The ends of core 42 are closed by headers 47 and 48 attached to shell 40. Each of said headers is provided with transverse interior walls 49 and 50 which define reactant gas introduction zones 51, hydrogen-containing gas introduction zones 52, the product gas withdrawal zones 53. Each of the reactant gas introduction zones 51 communicates with reactant gas preheating tubes 45 and with reactant gas manifold 54 which leads from an exterior supply of reactant gas, not shown. Each of the hydrogen-containing gas introduction zones 52 communicates with hydrogen-containing gas preheating zones 46 and with hydrogen-containing gas manifold 55 which leads from an exterior supply of hydrogen-containing gas, not shown. Each of said product gas withdrawal zones 53 communicates with chamber 43 and with product gas withdrawal conduit 56 which leads to product gas storage and recovery means, not shown.

Operation of this reactor is substantially the same as that of the reactor shown in Figures 1 and 2. The reactant gas is introduced into the reactor through manifold 54, and passes by way of introduction zones 51 to preheating zones 45. During its passage through zones 45 the reactant gas is preheated by indirect heat exchange against hot product gases which occupy the adjacent chambers 43. The hydrogen-containing gas is introduced into the reactor through manifold 55, and passes by way of introduction zones 52 through preheating zones 46 and into the enlarged chambers 44. The latter serve to promote uniform introduction of the hydrogen-containing gas into the reaction zones 57. Reaction occurs upon such admixing as previously described, and the hot product gases pass through the remaining length of chambers 43 which constitute quenching zones wherein heat is transferred to the adjacent preheating zones 45 and 46. The quenched product gases are withdrawn from the reactor through withdrawal zones 53 and conduits 56, and are passed to product gas storage means, not shown.

It will readily be seen that the reactor of Figures 3 and 4 operates on the same principle as that of Figures 1 and 2, but differs therefrom in that each of the two streams of reactant gases which pass countercurrently and in heat exchange relationship through the reactor is subdivided into a plurality of concurrent streams. By operating in this manner, both the capacity and the thermal efficiency of the reactor are greatly increased. As will be readily apparent to those skilled in the art, multi-chambered reactors of the general type shown in Figures 3 and 4 may take a variety of forms. Thus, the chambers which constitute the reaction and quenching zones and the preheating zones associated therewith may be arranged in a circular pattern, with the reaction vessel taking the form of a closed cylinder. Similarly, the hydrogen-containing gas may be introduced into the reaction zone coaxially with the reactant gas or from a direction perpendicular thereto; and the enlarged chambers 44 may be of varying sizes and shapes adapted to promote intimate non-turbulent mixing of the hydrogen-containing gas and the reactant gas in reaction zone 57, or may be omitted entirely. Also, if desired the reactant gas preheating tubes may be eliminated, whereby the bore which is described as receiving these tubes will itself serve as the preheating zone.

Other modes of applying the principle of my invention may be employed instead of those explained, change being made as regards the means employed provided the combination of elements stated by any of the following claims, or the equivalent of such stated combination of elements, be employed. This application is a division of my co-pending application Serial No. 217,633, filed March 26, 1951.

I therefore, particularly point out and distinctly claim as my invention:

1. An apparatus for the production of acetylene comprising an elongated closed vessel having at least one heat-conducting longitudinal internal partition dividing said vessel into at least two adjacent elongated chambers of substantially equal volume; a conduit disposed coaxially within each of said chambers, the conduits associated with alternate chambers extending from one end of the vessel to a point on the proximate side of the transverse central plane of the vessel and the conduits associated with the remaining chambers extending from the opposite end of the vessel to a point on the proximate side of said transverse central plane, said conduits thus terminating at points on opposite sides of said transverse central plane and failing to overlap by an appreciable distance adjacent said transverse central plane; reactant gas inlet means communicating with the exterior end of each of said conduits; product gas withdrawal means communicating with that end of each of said chambers which is opposite the conduit associated therewith; and hydrogen-containing gas inlet means communicating with each of said chambers at a point adjacent the inner terminus of the conduit associated therewith.

2. An apparatus according to claim 1 wherein the hydrogen-containing gas inlet means are disposed coaxially with the said conduits.

3. An apparatus for the production of acetylene comprising an elongated refractory mass having opposed end faces and provided with a first set of uniformly spaced longitudinal chambers extending from one end face thereof to a point beyond the transverse central plane of said mass and with a second set of uniformly spaced longitudinal chambers extending from the opposite end face of said mass to a point beyond the transverse central plane thereof, said sets of chambers thus overlapping for an appreciable distance adjacent said transverse central plane, the axes of said first and second sets of chambers being substantially parallel but spaced apart so that each of said first set of chambers is adjacent to a member of said second set of chambers and is separated therefrom by a relatively thin internal wall of said mass; a conduit communicating with the inner terminus each of said chambers and the proximate end face of the mass, said conduits being of such length that the conduits associated with said first set of chambers fail to overlap the conduits associated with said second set of chambers by an appreciable distance adjacent said transverse central plane; reactant gas introduction means communicating with the exterior end of said conduits; product gas withdrawal means communicating with the exterior end of each of said chambers; and hydrogen-containing gas introduction means communicating with each of said chambers at a point adjacent the inner terminus thereof.

4. An apparatus according to claim 3 wherein the conduit associated with each chamber extends within the chamber to a point on the proximate side of the transverse central plane of the mass.

5. An apparatus according to claim 4 wherein each chamber is of enlarged cross-section for a portion of its length adjacent the inner terminus thereof.

6. An apparatus according to claim 5 wherein the hydrogen-containing gas introduction means communicates with the enlarged portion of each chamber.

References Cited in the file of this patent

UNITED STATES PATENTS 2,700,594  Bills _____ Jan. 25, 1955